US006958552B2

(12) United States Patent
Dodson, III

(10) Patent No.: US 6,958,552 B2
(45) Date of Patent: Oct. 25, 2005

(54) FAILSAFE POWER ORING WITH CURRENT SHARING

(75) Inventor: George Bertran Dodson, III, Glendale, CA (US)

(73) Assignee: ADC DSL Systems, Inc., Eden Prairie, MN (US)

(*) Notice: Subject to any disclaimer, the term of this patent is extended or adjusted under 35 U.S.C. 154(b) by 395 days.

(21) Appl. No.: 10/119,512

(22) Filed: Apr. 10, 2002

(65) Prior Publication Data

US 2003/0193244 A1 Oct. 16, 2003

(51) Int. Cl.[7] .............................................. H02J 1/10
(52) U.S. Cl. ........................................ 307/52; 307/57
(58) Field of Search ............................. 307/57, 82, 53, 307/52; 323/272

(56) References Cited

U.S. PATENT DOCUMENTS 3,784,803 A * 1/1974 Brendle ...................... 708/838
5,834,925 A * 11/1998 Chesavage .................. 323/272

* cited by examiner

Primary Examiner—Robert L. DeBeradinis
(74) Attorney, Agent, or Firm—Fogg and Associates, LLC; Laura A. Ryan

(57) ABSTRACT

A current sharing circuit provides redundant power supplies with current sharing through the use of multiple feedback loops and existing circuit diodes to generate shared load current within predefined load voltage regulation requirements. A method of sharing current allows adjustment of the feedback loops to accommodate characteristics of the circuit.

18 Claims, 2 Drawing Sheets

FAILSAFE POWER ORING WITH CURRENT SHARING

The present invention relates generally to current sharing, and more specifically to current sharing in redundant power supplies.

BACKGROUND

In high availability digital systems using an array of circuit cards with a common back plane interconnect, it is common practice to provide redundant powering of shared circuitry in order to reduce the frequency of system down time due to power supply failure. Power converter circuits providing this function are required to have fast response times so that in the event of a failure of one of the power sources, the others remaining respond to pick up the additional load without bus voltage varying outside of normal operation tolerances, thereby avoiding interruption of service. The sharing of load current has the advantages of reducing circuit reaction time to sudden load increases such as those occurring during a converter failure. Current sharing also reduces stress on individual power converters, thereby increasing power supply MTBF mean time before failure (MTBF) and system availability.

In circuits which do not have current sharing, there can be response time problems when a power supply or source fails or goes offline, since a backup power source or supply must pick up the load quickly. When there is not a current shared redundancy, the secondary source is typically in a saturated off condition. It takes time for the secondary power supply to respond to the increase in load demand. The response time required from a saturated off state to a full power operating state is greater than the response time from half power operating to that of full power operation.

Current sharing is typically accomplished in circuits by using an interconnection between power supplies, typically a current control signal which forces all of the power supplies to operate at approximately the same current level. Such a scheme provides excellent current sharing, but a fault on the current control line can cause the entire system to shut down. Techniques for preventing such a shutdown are very complicated, often including custom integrated circuits (ICs). Current sharing may also be accomplished by adding resistance in series with source outputs. Larger output resistances result in better current balance between sources but result in poorer voltage regulation and power loss, so there are trade offs between regulation and current balance between outputs.

There is a need in the art for current sharing which provides redundant power, balanced current sharing and low loss.

SUMMARY

In one embodiment, a current sharing circuit includes first and second power sources, and first and second feedback loops for each power source. Feedback loops are connected between outputs of their respective sources and the inverting inputs of their respective source.

In another embodiment, a circuit includes at least two power sources, each with a diode between its respective output and a common load, and each having a pair of differential inputs. The first, non inverting differential input is connectable to a precision voltage reference. The second, inverting differential input is connected to first and second feedback loops for each power source. The first feedback loop is connected from each power source output to its respective inverting differential input. Second feedback loops are connected from the common load to each power source inverting differential input.

In yet another embodiment, a method for current sharing in a redundant power supply system includes combining at least two power supply outputs at a common load node, and feeding back power supply output and diode filtered power supply output back to a differential amplifier for each power supply. Apparent source resistance is adjusted through the proportions of DC feedback provided by first and second loops.

In still another embodiment, a method of sharing current for multiple power sources includes diode oring the outputs from each of the power sources and feeding back each power supply output signal through first and second loops. The first loop is a direct raw output loop and the second loop is a diode filtered loop.

In yet another embodiment, a method of current sharing in a multiple source system includes combining outputs of each of the multiple sources, applying a load to the combined output, and measuring the effect of the load on current sharing and voltage regulation in the system. Each source output is fed back to a source input through a pair of feedback loops. The feedback loops are adjusted for an acceptable compromise between good current sharing and voltage regulation.

Other embodiments are described and claimed.

DETAILED DESCRIPTION

In the following detailed description of the embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention.

Figure 1:
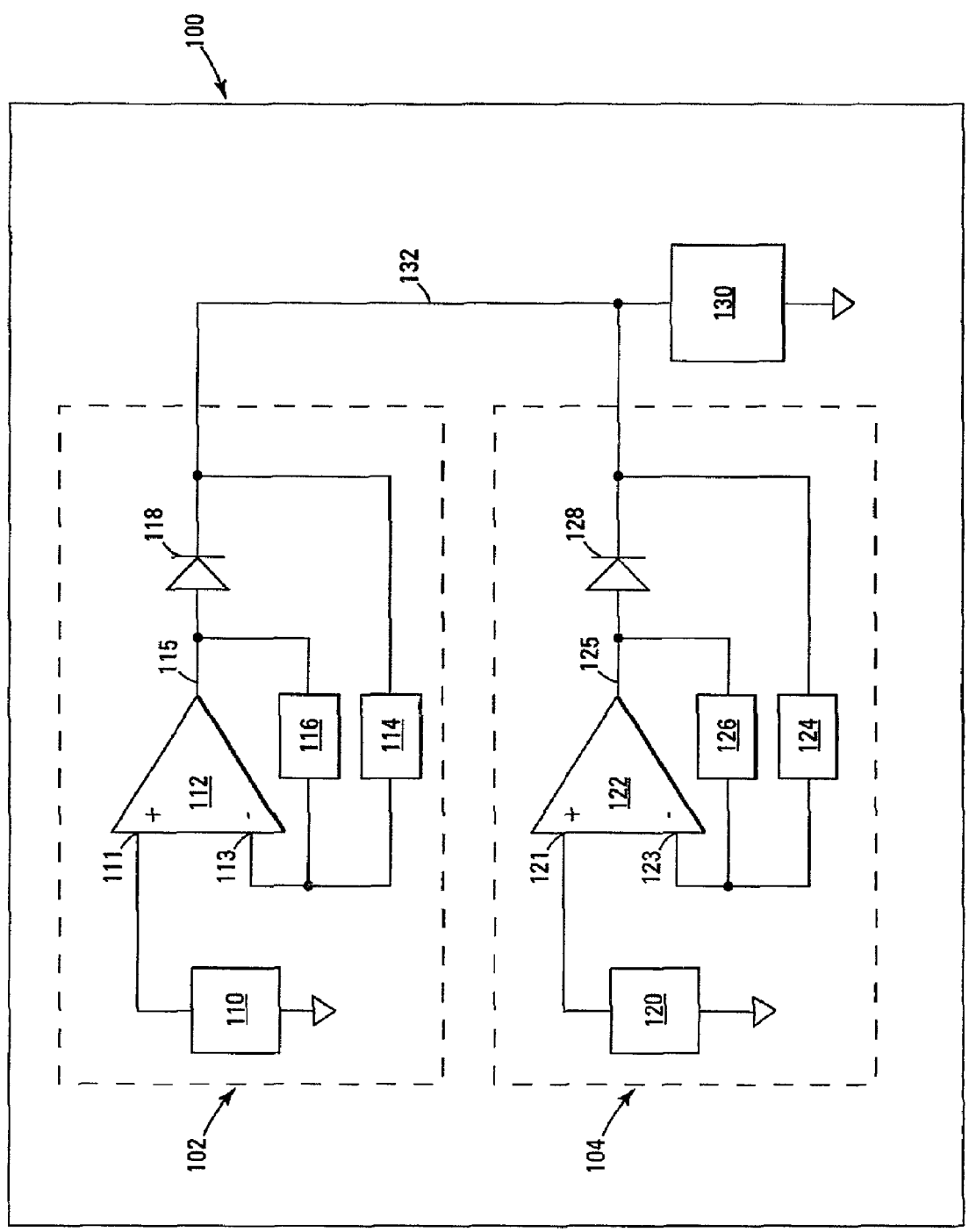
FIG. 1 is a block diagram of a circuit according to one embodiment of the present invention.

FIG. 1 is a block diagram view of a current sharing circuit 100 according to one embodiment of the present invention. Circuit 100 comprises two branches 102 and 104 having branch outputs connected commonly at node 132 to a common load 130. In branch 102, differential power source 112 has a precision voltage reference 110 connected to non inverting differential input 111. The output 115 of power source 112 is supplied to feedback loop 116 which feeds back to the inverting differential input 113 of the source 112. The output 115 is also supplied to diode 118 at its anode. The output from the cathode of the diode 118 is supplied to the common load 130 at node 132 and to second feedback loop 114 which also supplies inverting differential input 113 of source 112.

In branch 104, differential power source 122 has a precision voltage reference 120 connected non inverting differential input 121. The output 125 of power source 122 is supplied to feedback loop 126 which supplies inverting differential input 123 of the source 122. Source output 125 is also supplied to diode 128 at its anode. The output from the cathode of the diode 128 is supplied to the common load 130 at node 132 and to the second feedback loop 124 which also supplies the inverting differential input 123 of source 122.

Power source 112 employs the two feedback loops 114 and 116 to sense the load voltage at node 132 and the source voltage 115 respectively. Power source 122 operates in a similar manner using feedback loops 124 and 126 which sense voltages at nodes 132 and 125 respectively. With only feedback loops 114 and 124 present, voltage regulation will be excellent at node 132 due to the high loop gain of sources 112 and 122, but there will be no current sharing as small differences between reference voltages 110 and 120 as well as offset voltage differences between sources 112 and 122 will force one source into negative saturation, turning it off and forcing the other source to shoulder the entire load 130.

Items 112 and 122 are power sources with differential inputs. Items 110 and 120 are precision voltage references. It is difficult if not impossible to exactly match precision voltage references. The outputs of power sources 112 and 122 are diode ored using diodes 118 and 128 to provide a combined output voltage at 132 which is unaffected by the non operation of one of the sources due to the isolation provided by reverse biased diodes 118 and 128.

Conversely, if only feedback loops 116 and 126 are present, voltage regulation at nodes 115 and 125 will be excellent and resistances of diodes 118 and 128 will allow current sharing. However, regulation at node 132 will be poor for low voltage systems due to relatively large voltage variation across diodes 118 and 128 with varying load currents and temperature. Usage of only loops 116 and 126 would result in an unacceptable voltage variation at load 130 with changes in current. Even though supplies would do a good job of sharing current, load regulation would be unacceptably poor. This will occur because as more current is demanded at the output, diode drop voltages will increase, thereby reducing the voltage appearing at node 132. As each diode has voltage drops which, in the present embodiments, are a substantial percentage of the load voltage, load regulation will suffer. In one embodiment, the diode has a voltage drop that is about half the load voltage so even very small variations in the diode are significant when compared with a 10% load voltage tolerance.

In contrast, using only loops 124 and 114, which provide precise regulation at the load, will result in the one converter, with slightly higher output voltage, supplying all the load current while the other converter, with the slightly lower output voltage, will be forced into a saturated off condition.

Using both loops 114 and 116 in branch 102, and both loops 124 and 126 in branch 104, there is provided a system having good voltage regulation at the load 130, while still maintaining good current sharing.

By proportioning the feedback of loop 114 to loop 116, the apparent resistance of source 112 as seen by load 130 can be varied anywhere between the impedance of diode 118, to values nearly zero so as to allow a compromise between acceptable load voltage regulation and current sharing. For relatively equal current sharing, the same proportioning is implemented between loop 124 and loop 126. This will produce approximately equal output resistances in branch 102 and branch 104 which will result in essentially equal branch output currents for approximately equal branch output voltages. All sources are intended to share current as equally as possible with nearly identical output voltage and resistance parameters determined during a design phase. Proportioning of the two feedback loops in each branch acts to select a percentage of the diode resistance as the apparent source resistance. This percentage can be varied from zero (0) to one hundred (100) per cent of the diode resistance.

Additionally, control loop parameters of source 112 or 122 are more nearly constant with the addition of feedback loops 116 and 126 as opposed to only loops 114 and 124. Both sources, 112 and 124, always have minimum amounts of feedback guaranteed by loops 116 and 126. In one embodiment, the variation in feedback is less than a three to one ratio when comparing a single source powering the load to two or more sources sharing the load. With feedback loops 114 and 124 only, feedback varies from nearly zero (open loop) for one source which is saturated off, to maximum feedback (unity gain) for the source taking total control of the load current. This is a variation of over one thousand to one. Where feedback is only by means of loops 114 and 124, in essence, there is no feedback the for the one source which becomes saturated, with its output diode reversed biased. Closed loop gain becomes very high and the circuit is both sensitive to noise and prone to oscillation when both sources are very close to the same voltage. Sources may oscillate between on and an off states. When reverse biased, a diode acts as a switch, therefore loop 114 or 124 can not guarantee feedback from the source output back to the source input.

Further, proportioning the majority of high frequency feedback through loops 116 and 126 in one embodiment results in greater stability. Excessive phase shift in feedback loops 114 or 124 can occur due to the impedance of diodes 118 and 128 in conjunction with capacitance at load 130. Proportioning most of the high frequency feedback through loops 116 and 126 stabilizes the circuit, because due to their much lower proportions, high frequency phase shift introduced by loops 114 and 124 becomes negligible after being combined with dominant high frequency feedback from loops 116 and 126 at inverting inputs 113 and 123 respectively.

When the high frequency feedback is proportioned primarily through loops 116 and 126, the variation in overall high frequency loop characteristics is significantly less, so the required compensation is more nearly constant.

It is recognized that current sharing could also be incorporated by means of adding resistance between diodes 118 and 128 and load 130 using a single point of feedback from the junction of diode 118 cathode and the supplied resistance. As this would result in additional and unnecessary power loss, it is inferior to the present embodiment.

In a method according to one embodiment of the invention, the sources are made to look resistive by proportioning the feedback loops given known characteristics of the sources, the diodes, and the loops themselves. When sources look resistive, rather than their impedances looking low or near zero, multiple sources share current automatically without the need for a current control signal. In this embodiment, the sources are made to look resistive using existing components in the circuit, namely the diodes 118 and 128. Specifically, the known voltage drop across the diodes 118 and 128 is used to assist in the provision of the signal used to make the output look resistive. This is accomplished in one embodiment by feeding the signals from the combined output at node 132 and from the source output at nodes 115 or 125 respectively through the two feedback loops, 114 and 116, and 124 and 126, respectively, to the inverting differential inputs 113 and 123 of the sources 112 and 122.

In one embodiment, the existing diode in a circuit is used for its voltage drop across the diode to provide a signal which makes the output appear resistive. Since the diodes already appear in current sharing circuitry, there are no additional power components required to implement the various embodiments of the present invention.

The voltage drop across the diodes, for example diodes 118 and 128, is used in one embodiment to provide the signal which makes the outputs 115 and 125 appear resistive. The two feedback loops for each branch are fed back to their respective sources. The two feedback networks are engineered to provide any desired amount of regulation. Regulation in various embodiments is from a maximum regulation to a minimum regulation, and allows great flexibility in fine adjustment in the trade off between output voltage regulation and balanced sharing between sources.

Figure 2:
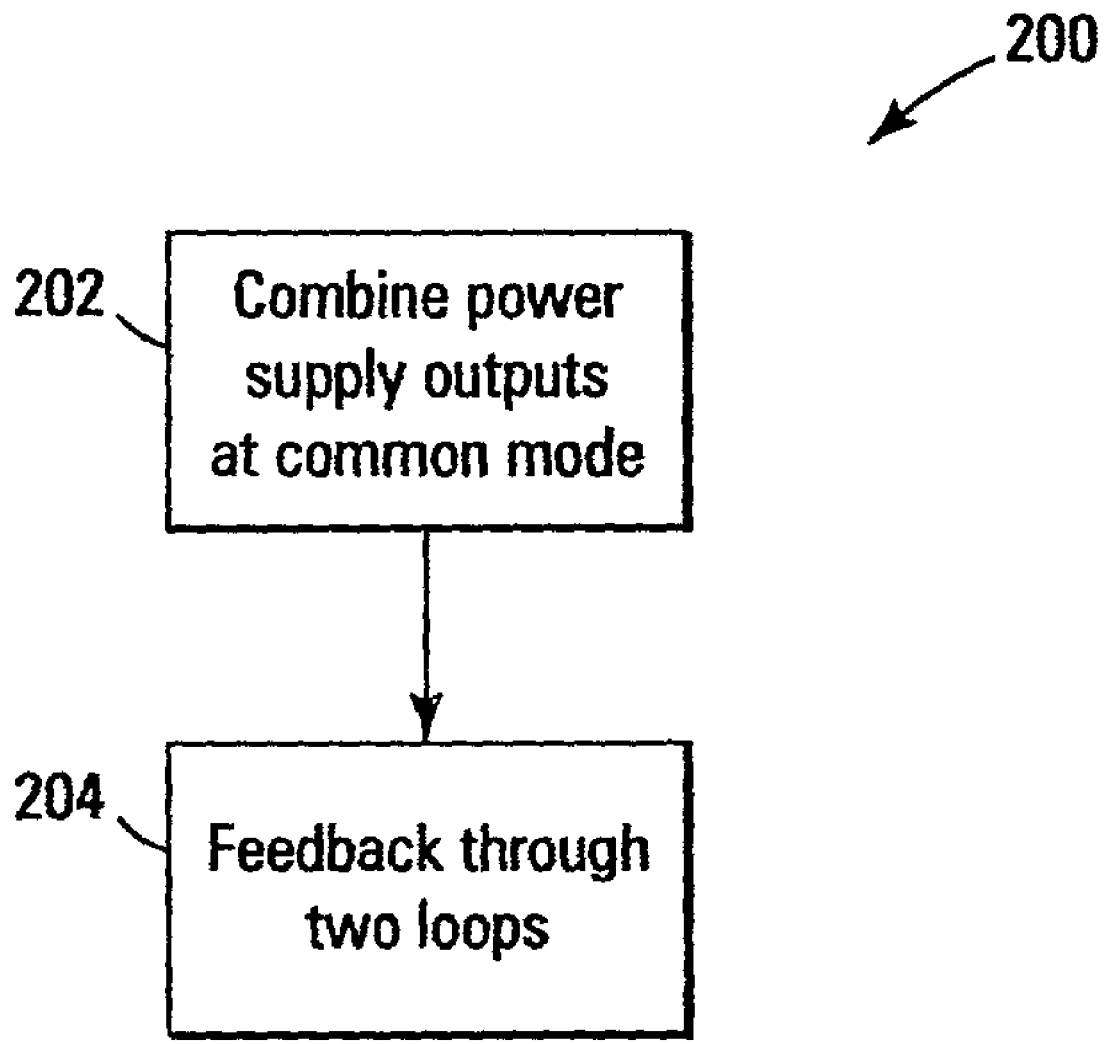
FIG. 2 is a flow chart diagram of a method according to another embodiment of the present invention.

FIG. 2 is a flow chart diagram of a method 200 of current sharing in a redundant power supply system. The method 200 comprises combining at least two power supply outputs at a common load node in block 202, and feeding back power supply output and diode filtered power supply output to a differential amplifier for each power supply in block 204. During design, the source resistance is adjusted through proportioning the feedback loops as has been discussed above. In one embodiment, feeding back comprises combining raw power supply output and diode filtered power supply output at an inverting differential amplifier input, and supplying a reference voltage at another differential amplifier non-inverting input.

In still another embodiment, regulation is accomplished by adding resistance in series with the diodes. This solution, however, creates additional system loss which is undesirable.

In one embodiment, there is a desired compromise between current sharing and regulation. In this embodiment, the highest resistance value that allows the voltage regulation limits to be met is used. This provides the best current balance for the characteristics. A tradeoff is that higher resistance values result in poorer regulation. It is usually regulation limits that are imposed by a user or customer, so meeting the regulation specifications limits the maximum resistance value. As has been mentioned, in one embodiment, the highest resistance value that still allows the meeting of the regulation limits is used.

The embodiments of the present invention provide good current balance and load regulation within limits by providing two feedback loops which compensate for differences in sources, components, and reference voltages. Diodes already present in the circuits are used for making the sources look resistive without the need for further components.

Although two power supplies are shown in circuit 100, it should be understood that other circuit embodiments of the present invention allow scalability of the number of power supplies. Such other circuits add additional branches to the circuit, and are within the scope of the invention.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method of sharing current for multiple power sources, comprising:
   diode oring the outputs from each of the power sources;
   feeding back each power supply output signal through first and second loops, wherein the first loop is a direct raw output loop and the second loop is a diode filtered loop.

2. The method of claim 1, wherein feeding back further comprises: weighting high frequency feedback through the direct raw loop for each source.

3. The method of claim 1, and further comprising:
   using the voltage drop across a diode to approximate a resistive load.

4. A method for current sharing in a redundant power supply system, comprising:
   combining at least two power supply outputs at a common load node;
   feeding back each power supply outputs through first and second loops, wherein the first loop is a direct raw output loop and the second loop is a diode filtered loop; and
   adjusting source resistance through the use of the feedback.

5. The method of claim 4, wherein feeding back comprises:
   combining raw power supply output and diode filtered power supply output at a differential amplifier input, and supplying a reference voltage at another differential amplifier input.

6. The method of claim 4, wherein combining comprises diode oring the two power supply outputs.

7. A method of current sharing in a multiple source system, comprising:
   combining outputs of each of the multiple sources;
   applying a load to the combined outputs; and
   feeding back each output to a source input through a pair of feedback loops, wherein the first loop is a direct raw output loop and the second loop is a diode filtered loop.

8. The method of claim 7, wherein a majority of high frequency feedback is proportioned through the first loop.

9. The method of claim 7, and further comprising:
   synthesizing a source resistance; and
   adjusting parameters of the feedback loops within pre-defined limits.

10. A current sharing circuit, comprising:
    first and second power sources; and
    first and second feedback loops for each power source, the feedback loops connected between an output of their respective source and a differential input of their respective source,
    wherein each first feedback loop is a direct raw output loop connected directly between the output of its respective source and a node connected to the differential input, and
    wherein each second feedback loop includes a diode having its anode connected to the output and wherein each second feedback loop is connected between the diode cathode and to the differential input.

11. A circuit, comprising:
    at least two power sources, each power source having a pair of differential inputs, each first differential input connectable to a respective precision voltage reference;
    a pair of diodes, each of the power sources having one of the pair of diodes connected to its respective output;
    a pair of first feedback loops, each first feedback loop connected between a first node between its respective source output and its diode and the other differential input of the respective power source;
    a pair of second feedback loops, each second feedback loop connected between its diode output and the other differential input of the respective power source;
    the outputs of the diodes connected to a common node load.

12. The circuit of claim 11, wherein the first feedback loop is settable according to characteristics of the circuit.

13. The circuit of claim 11, wherein the second feedback loop is settable according to characteristics of the circuit.

14. The circuit of claim 11, wherein a majority of high frequency feedback is proportioned through the first feedback loops.

15. A method for redundantly supplying power to a load, comprising:
   diode oring outputs of two power supplies;
   regulating the power supplies by comparison to a precision voltage reference for each power supply;
   sensing an output voltage for each source;
   sensing a combined load voltage; and
   summing the sensed output voltages and combined load voltages.

16. The method of claim 15, wherein summing is performed by differential amplifiers.

17. The method of claim 15, wherein summing further comprises:
   adjusting the proportions of the sensed output voltages and the combined load voltages according to characteristics of a circuit.

18. A circuit, comprising:
   a first branch comprising:
      a first power source having a pair of differential inputs;
      a first power source reference potential connected to one of the first power source differential inputs;
      a first feedback loop connected between the output of the first power source and the other of the first power source differential inputs;
      a second feedback loop;
      a first diode connected between the output of the first power source and the second feedback loop, the second feedback loop also connected to the other of the first power source differential inputs; and
   a second branch comprising:
      a second power source having a pair of differential inputs;
      a second power source reference potential connected to one of the second power source differential inputs;
      a third feedback loop connected between the output of the second power source and the other of the second power source differential inputs;
      a fourth feedback loop;
      a second diode connected between the output of the second power source and the fourth feedback loop, the fourth feedback loop also connected to the other of the second power source differential inputs; and
   wherein the cathodes of the first and the second diodes are connected and are connectable to a load.

* * * * *